(12) United States Patent
Welland et al.

(10) Patent No.: US 10,956,758 B2
(45) Date of Patent: Mar. 23, 2021

(54) METHOD AND SYSTEM FOR PROVIDING AUTO SPACE MANAGEMENT USING VIRTUOUS CYCLE

(71) Applicant: Xevo Inc., Bellevue, WA (US)

(72) Inventors: Robert Victor Welland, Seattle, WA (US); Samuel James McKelvie, Seattle, WA (US); Richard Chia-Tsing Tong, Seattle, WA (US); Noah Harrison Fradin, Seattle, WA (US); Vladimir Sadovsky, Redmond, WA (US)

(73) Assignee: XEVO INC., Bellevue, WA (US)

( * ) Notice: Subject to any disclaimer, the term of this patent is extended or adjusted under 35 U.S.C. 154(b) by 0 days.

(21) Appl. No.: 15/621,723

(22) Filed: Jun. 13, 2017

(65) Prior Publication Data

US 2017/0357864 A1 Dec. 14, 2017

Related U.S. Application Data

(60) Provisional application No. 62/349,468, filed on Jun. 13, 2016.

(51) Int. Cl.
*H04L 29/08* (2006.01)
*G06K 9/00* (2006.01)
(Continued)

(52) U.S. Cl.
CPC ............ *G06K 9/00812* (2013.01); *B60R 1/00* (2013.01); *G06K 9/00845* (2013.01);
(Continued)

(58) Field of Classification Search
CPC . B60R 1/00; B60R 2300/105; B60R 2300/30; B60R 2300/50; G06K 9/00791;
(Continued)

(56) References Cited

U.S. PATENT DOCUMENTS 5,170,352 A 12/1992 Mctamaney et al.
5,465,079 A 7/1995 Bouchard et al.
(Continued)

FOREIGN PATENT DOCUMENTS

CN 104504400 A 4/2015
DE 10 2014 217 900 A1 3/2016
(Continued)

OTHER PUBLICATIONS

International Search Report for PCT/US2017/068350, dated Apr. 19, 2018, (See also English Abstract for KR 10-2011-0105124), Korean Intellectual Property Office, Republic of Korea.
(Continued)

*Primary Examiner* — Md N Haque
(74) *Attorney, Agent, or Firm* — Seed IP Law Group LLP

(57) ABSTRACT

A method or system capable of managing automobile parking space ("APS") using containerized sensors, machine learning center, and cloud based network is disclosed. A process, in one aspect, monitors the surrounding information observed by a set of onboard sensors of a vehicle as the vehicle is in motion. After selectively recording the surrounding information in accordance with instructions from a containerized APS model which is received from a machine learning center, an APS and APS surrounding information are detected when the vehicle is in a parked condition. Upon rewinding recorded surrounding information leading up to the detection of APS, labeled data associated with APS is generated based on APS and the recorded surrounding information. The process subsequently uploads the labeled data to the cloud based network for facilitating APS model training at the machine learning center via a virtuous cycle.

19 Claims, 13 Drawing Sheets

(51) Int. Cl.
*G06N 20/00* (2019.01)
*G06K 9/62* (2006.01)
*B60R 1/00* (2006.01)
*G06K 9/66* (2006.01)

(52) U.S. Cl.
CPC .............. *G06K 9/6293* (2013.01); *G06K 9/66* (2013.01); *G06N 20/00* (2019.01); *B60R 2300/105* (2013.01); *B60R 2300/30* (2013.01); *B60R 2300/50* (2013.01); *G06K 9/00791* (2013.01); *H04L 67/12* (2013.01)

(58) Field of Classification Search
CPC .. G06K 9/00812; G06K 9/00845; G06K 9/66; G06N 99/005
See application file for complete search history.

(56) References Cited

U.S. PATENT DOCUMENTS

| | | | |
|---|---|---|---|
| 5,910,782 A * | 6/1999 | Schmitt | G08G 1/14 340/539.1 |
| 8,903,591 B1 | 12/2014 | Ferguson et al. | |
| 9,601,018 B2 * | 3/2017 | Cogill | G08G 1/143 |
| 10,241,509 B1 | 3/2019 | Fields et al. | |
| 2005/0280555 A1 | 12/2005 | Warner, IV | |
| 2006/0250278 A1 | 11/2006 | Tillotson et al. | |
| 2006/0267799 A1 | 11/2006 | Mendelson | |
| 2007/0029825 A1 * | 2/2007 | Franklin | B60R 9/10 293/128 |
| 2007/0040701 A1 | 2/2007 | Browne et al. | |
| 2010/0265074 A1 | 10/2010 | Namba et al. | |
| 2012/0092190 A1 | 4/2012 | Stefik et al. | |
| 2012/0290215 A1 | 11/2012 | Adler et al. | |
| 2013/0057686 A1 * | 3/2013 | Genc | B60R 1/00 348/148 |
| 2013/0085637 A1 * | 4/2013 | Grimm | B60W 30/06 701/25 |
| 2013/0246181 A1 | 9/2013 | Lobsenz | |
| 2014/0111647 A1 | 4/2014 | Atsmon et al. | |
| 2014/0150100 A1 | 5/2014 | Gupta et al. | |
| 2014/0223284 A1 | 8/2014 | Rankin, Jr. et al. | |
| 2014/0244150 A1 | 8/2014 | Boesch et al. | |
| 2014/0266800 A1 | 9/2014 | Koukoumidis et al. | |
| 2014/0276090 A1 | 9/2014 | Breed | |
| 2015/0138001 A1 | 5/2015 | Davies et al. | |
| 2015/0170518 A1 * | 6/2015 | Rodriguez Garza | G08G 1/144 340/932.2 |
| 2015/0294567 A1 * | 10/2015 | De La Plaza Ortega | G08G 1/144 340/932.2 |
| 2016/0042650 A1 | 2/2016 | Stenneth | |
| 2016/0046298 A1 | 2/2016 | DeRuyck et al. | |
| 2016/0055749 A1 * | 2/2016 | Nicoll | G08G 1/143 340/932.2 |
| 2016/0104486 A1 | 4/2016 | Penilla et al. | |
| 2016/0117866 A1 * | 4/2016 | Stancato | G07C 9/00896 705/5 |
| 2017/0046955 A1 | 2/2017 | Shen | |
| 2018/0204465 A1 | 7/2018 | Tong et al. | |
| 2019/0213429 A1 | 7/2019 | Sicconi et al. | |

FOREIGN PATENT DOCUMENTS

| | | | |
|---|---|---|---|
| DE | 102014217900 | * | 3/2016 |
| EP | 1 950 098 A1 | | 7/2008 |
| EP | 2869282 A1 | | 5/2015 |
| KR | 10-2011-0105124 A | | 9/2011 |

OTHER PUBLICATIONS

International Search Report for PCT/US2017/037320, dated Aug. 25, 2017, Korean Intellectual Property Office, Republic of Korea.
Non-Final Office Action dated Aug. 8, 2018, for U.S. Appl. No. 15/853,593, 21 pages.
Amendment in response to Non-Final Office Action (dated Aug. 8, 2018), for U.S. Appl. No. 15/853,593, filed Aug. 30, 2018, 8 pages.
Notice of Allowance dated Aug. 6, 2019 for U.S. Appl. No. 15/621,835, filed Jun. 13, 2017, Method and System for Providing Behavior of Vehicle Operator Using Virtuous Cycle, First Named Inventor: Robert Welland, 25 Pages.
Non-Final Office Action dated Jun. 14, 2019 for U.S. Appl. No. 15/621,835 "Method and System for Providing Behavior of Vehicle Operator Using Virtuous Cycle" filed Jun. 13, 2017. First named inventor: Robert Victor Welland.
Amendment filed Jun. 20, 2019 for U.S. Appl. No. 15/621,835 "Method and System for Providing Behavior of Vehicle Operator Using Virtuous Cycle" filed Jun. 13, 2017. First named inventor: Robert Victor Welland.
Mathijs Jeroen Scheepers, Virtualization and Contrainerization of Application Infrastructure: A Comparison, Website, Jun. 23, 2014, 7 pages, The Netherlands.
Supplementary European Search Report dated Jun. 20, 2020, for European Application No. 17813973.9, 12 pages, European Patent Office, Munich Germany.
EP 17813967.1—Extended European Search Report, dated Feb. 24, 2020, 13 pages.
PCT/US2017/037337—PCT International Search Report and Written Opinion, dated Aug. 16, 2017, 10 pages.
Notice of Allowance and Examiners Amendment dated Nov. 29, 2018 for U.S. Appl. No. 15/853,593, filed Dec. 22, 2017, 26 pages.

* cited by examiner

METHOD AND SYSTEM FOR PROVIDING AUTO SPACE MANAGEMENT USING VIRTUOUS CYCLE

PRIORITY

This application claims the benefit of priority based upon U.S. Provisional Patent Application having an application Ser. No. 62/349,468, filed on Jun. 13, 2016, and having a title of "Method and System for Providing Intelligent Networks Using Internet, Machine Learning, and Big Data." which is hereby incorporated by reference in its entirety.

RELATED APPLICATION

This application is related to the following co-pending application assigned to the Assignee of the present invention.
a. application Ser. No. 15/621,835, filed Jun. 13, 2017, entitled "Method and System for Providing Behavior of Vehicle Operator Using Virtuous Cycle," now issued as U.S. Pat. No. 10,460,183, issued Oct. 29, 2019, invented by the same inventors.

FIELD

The exemplary embodiment(s) of the present invention relates to the field of communication networks. More specifically, the exemplary embodiment(s) of the present invention relates to a virtuous cycle between cloud, machine learning, and containerized sensors to perform a task.

BACKGROUND

With increasing popularity of automation and intelligent electronic devices, such as computerized machines, IoT (the Internet of Things), smart vehicles, smart phones, drones, mobile devices, airplanes, artificial intelligence ("AI"), the demand of intelligent machine and faster real-time response are increasing. For machine learning to become mainstream, a significant number of pieces, such as data management, model training, and data collection need to be improved.

Conventional machine learning is, in itself, an exploratory process which may involve trying different kinds of models, such as convolutional, RNN (recurrent neural network), attentional machine learning, et cetera. Machine learning or training typically concerns a wide variety of hyper-parameters that change the shape of model and modeling characteristics. As a result, model training generally requires intensive computation. As such, real-time response via machine learning model can be challenging.

SUMMARY

One embodiment of the presently claimed invention discloses a method or system capable of managing automobile parking space ("APS") using containerized sensors, machine learning center, and cloud based network. A process, in one aspect, monitors the surrounding information observed by a set of onboard sensors of a vehicle as the vehicle is in motion. After selectively recording the surrounding information in accordance with instructions from a containerized APS model which is received from a machine learning center, an APS and APS surrounding information are detected when the vehicle is in a parked condition. Upon rewinding recorded surrounding information leading up to the detection of APS, labeled data associated with APS is generated based on APS and the recorded surrounding information. The process subsequently uploads the labeled data to the cloud based network for facilitating APS model training at the machine learning center via a virtuous cycle.

In one aspect, the process is also able to correlate the labeled data with location information, time stamp, vicinity traffic condition, local events, additional sampling data, and weather conditions obtained from the cloud based network to update the correlated labeled data to APS. After the containerized APS model is trained at the machine learning center according to the correlated labeled data forwarded from the cloud based network to the machine learning center, the containerized APS model is pushed to an onboard digital processing unit in the vehicle via a wireless communication network. Note that monitoring surrounding information further includes activating outward-looking cameras situated on the vehicle to capture images while the vehicle is in motion. The APS model, in one example, identifies APS related images from the captured images and stores the APS related images in an onboard memory device of the vehicle.

After detecting an APS and APS surrounding information which indicates that a parking space is identified, the process rewinds the recorded surrounding information leading up to detection of the APS and generates labeled data associated with the APS. The labeled data, in one aspect, identifies the location as well as the orientation of APS based on recorded surrounding information prior to detecting APS. The process, in one example, is capable of separating real-time data from the labeled data and uploading the real-time data to the cloud based network in real-time via a wireless communication network. The process is also capable of separating batched data from the labeled data and uploading the batched data to the cloud based network at a later time.

During an operation of virtuous cycle, the cycle is able to feed the real-time labeled data from the vehicle to the cloud based network for correlating and revising labeled data. After forwarding revised labeled data to the machine learning center for training APS model, pushing is pushed to the vehicle for collecting surrounding information.

In an alternative embodiment, a network configuration able to manage APS in a geographic area using the virtuous cycle includes an automobile, cloud based network, and machine learning enter. The automobile contains a containerized sensing device configured to collect and selective record surrounding information observed by multiple onboard sensors in accordance with signals generated by the APS model when the automobile is in motion. The automobile includes a set of forward-looking cameras configured to collect real-time images as the automobile moves across a geographical area. The containerized sensing device of the automobile, in one example, includes a memory, controller, and transmitter, wherein the memory stores at least a portion of real-time images collected by the forward-looking cameras installed at the automobile.

The cloud based network is configured to correlate and generate labeled data associated with APS based on historical APS cloud data and the surrounding information is subsequently sent from the containerized sensing device. The cloud based network, in one example, correlates real-time data from the automobile with historical samples with large automobile population to produce labeled APS cloud data.

The machine learning center improves and/or trains the APS model based on the labeled data from the cloud based network. The machine learning center is configured to train and refine the APS model in response to the labeled APS cloud data from the cloud based network and generates a refined APS model. In operation, the automobile receives the refined APS model from the machine learning center and begins to collect surrounding information based on the refined APS model.

In one embodiment, A process capable of providing and managing APS using sensors, machine learning center, and cloud based network is capable of storing real-time data collected by a set of onboard sensors in a memory situated inside of the vehicle based on an APS model when the vehicle is driving. After detecting an APS when the vehicle is stopped as it is in a parked condition, a predefined section of stored real-time data is retrieved from the memory to identify the parking event associated with location of the APS. Upon generating labeled data associated with the APS, the labeled data is uploaded to the cloud based network for facilitating model training at a machine learning process via a virtuous cycle. In one aspect, the labeled data is correlated with location information, time stamp, and vicinity traffic condition obtained from the cloud based network for facilitating model training.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1A:
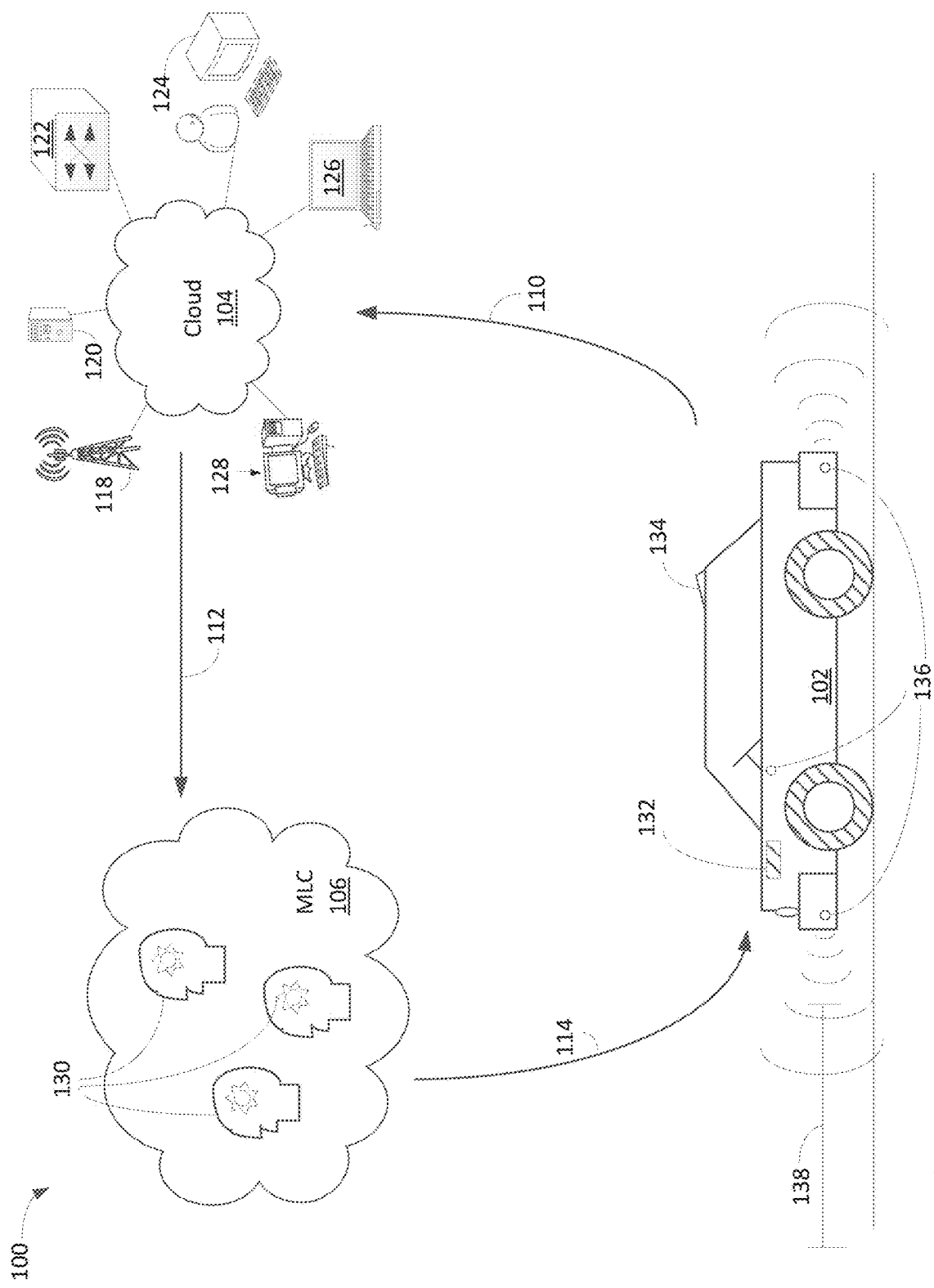
FIGS. 1A-B are block diagrams illustrating an automobile parking space ("APS") system capable of managing APS using a virtuous cycle in accordance with one embodiment of the present invention.

Embodiments of the present invention are described herein with context of a method and/or apparatus for facilitating APS management using cloud based network, containerized sensing device, and machine learning.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

In accordance with the embodiment(s) of present invention, the components, process steps, and/or data structures described herein may be implemented using various types of operating systems, computing platforms, computer programs, and/or general purpose machines. In addition, those of ordinary skills in the art will recognize that devices of a less general purpose nature, such as hardware devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory). FLASH Memory. Jump Drive, and the like), magnetic storage medium (e.g., tape, magnetic disk drive, and the like), optical storage medium (e.g., CD-ROM, DVD-ROM, paper card and paper tape, and the like) and other known types of program memory.

The term "system" or "device" is used generically herein to describe any number of components, elements, subsystems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

One embodiment of the presently claimed invention discloses an automobile parking space ("APS") system capable of managing APS using containerized sensors, machine learning center ("MLC"), and cloud based network ("CBN"). The APS system or process, in one aspect, monitors surrounding information captured by a set of onboard sensors of a vehicle as the vehicle is in motion. After selectively recording the surrounding information in accordance with a containerized APS model received from MLC, an APS and APS surrounding information are detected when the vehicle is in a parked condition. Upon rewinding recorded surrounding information leading up to the detection of APS, labeled data associated with APS is generated. The labeled data is subsequently uploaded to CBN for facilitating APS model training via a virtuous cycle.

To train from "no parking space" to "available parking space." certain amount of "not a parking space" data needs to be uploaded to ML for model training. Note that such data can be chosen at random from the camera feed.

FIG. 1A is a block diagram 100 illustrating an APS system capable of managing APS using a virtuous cycle in accordance with one embodiment of the present invention. Diagram 100 illustrates a virtuous cycle containing a vehicle 102, CBN 104, and MLC 106. In one aspect, MCL 106 can be located remotely or in the cloud. Alternatively, MCL 106 can be a part of CBN 104. It should be noted that the underlying concept of the exemplary embodiment(s) of the present invention would not change if one or more blocks (circuit or elements) were added to or removed from diagram 100.

Vehicle 102, in one example, can be a car, automobile, bus, train, drone, airplane, truck, and the like, and is capable of moving geographically from point A to point B. To simplify forgoing discussing, the term "vehicle" or "car" is used. Vehicle 102 includes wheels with ABS (anti-lock braking system), body, steering wheel, exterior or forward-looking cameras 136, antenna 134, onboard controller 132, and interior cameras. It should be noted that interior and/or exterior cameras 136 can be installed at front, side-facing, stereo, and interior of vehicle 102. In one example, vehicle 102 also includes various sensors which senses information related to vehicle state, vehicle status, driver actions, For example, the sensors, not shown in FIG. 1A, are able to collect information, such as ABS, steering, braking, acceleration, traction control, windshield wipers. GPS (global positioning system), radar, ultrasound, lidar, and the like.

Onboard controller 132 includes CPU (central processing unit), GPU (graphic processing unit), memory, and disk responsible for gathering data from exterior cameras 136, interior cameras, audio sensor, ABS, traction control, steering wheel, CAN-bus sensors, and the like. In one aspect, controller 132 executes APS model received from MLC 106, and interfaces with antenna 134 to communicate with CBN 104 via a wireless communication network 110. Note that wireless communication network includes, but not limited to, WIFI, cellular network, Bluetooth network, satellite network, or the like. A function of controller 132 is to gather or capture real-time surrounding information when the vehicle is driving.

CBN 104 includes various digital computing systems, such as, but not limited to, server farm 120, routers/switches 122, cloud administrators 124, connected computing devices 126-128, and network elements 118. A function of CBN 104 is to provide cloud computing which can be viewed as on-demand Internet based computing service with enormous computing power and resources. A function of CBN 104 is to improve or refine APS labeled data via correlating captured real-time data with relevant cloud data. The refined APS labeled data is subsequently passed to MLC 106 for model training via a connection 112.

MLC 106, in one embodiment, provides, refines, trains, distributes models 130 such as APS model(s) based on information or data such as APS labeled data provided from CBN 104. It should be noted that the machine learning makes predictions based on models generated and maintained by various computational algorithms using historical data as well as current data. A function of MLC 106 is that it is capable of pushing information such as revised APS model to vehicle 102 via a wireless communications network 114 in real-time.

In operation, when a driver or operator requests a vicinity parking space to APS system while vehicle 102 is moving across a metropolitan area, the APS system can provide an APS 138 to the operator in real-time indicating an available parking spot nearby via communication 114. It should be noted that in order to provide an accurate empty parking space to a driver, the APS system needs to know what a parking space looks like, where the vehicle is on the map, and which parking space is currently available or empty.

In one aspect, the APS system is capable of leveraging a statistical sample of a large number of vehicles to recognize available parking spaces whereby cars driving by a parking space but not taking it can report the spot to the APS system for other cars to leverage.

Figure 1B:
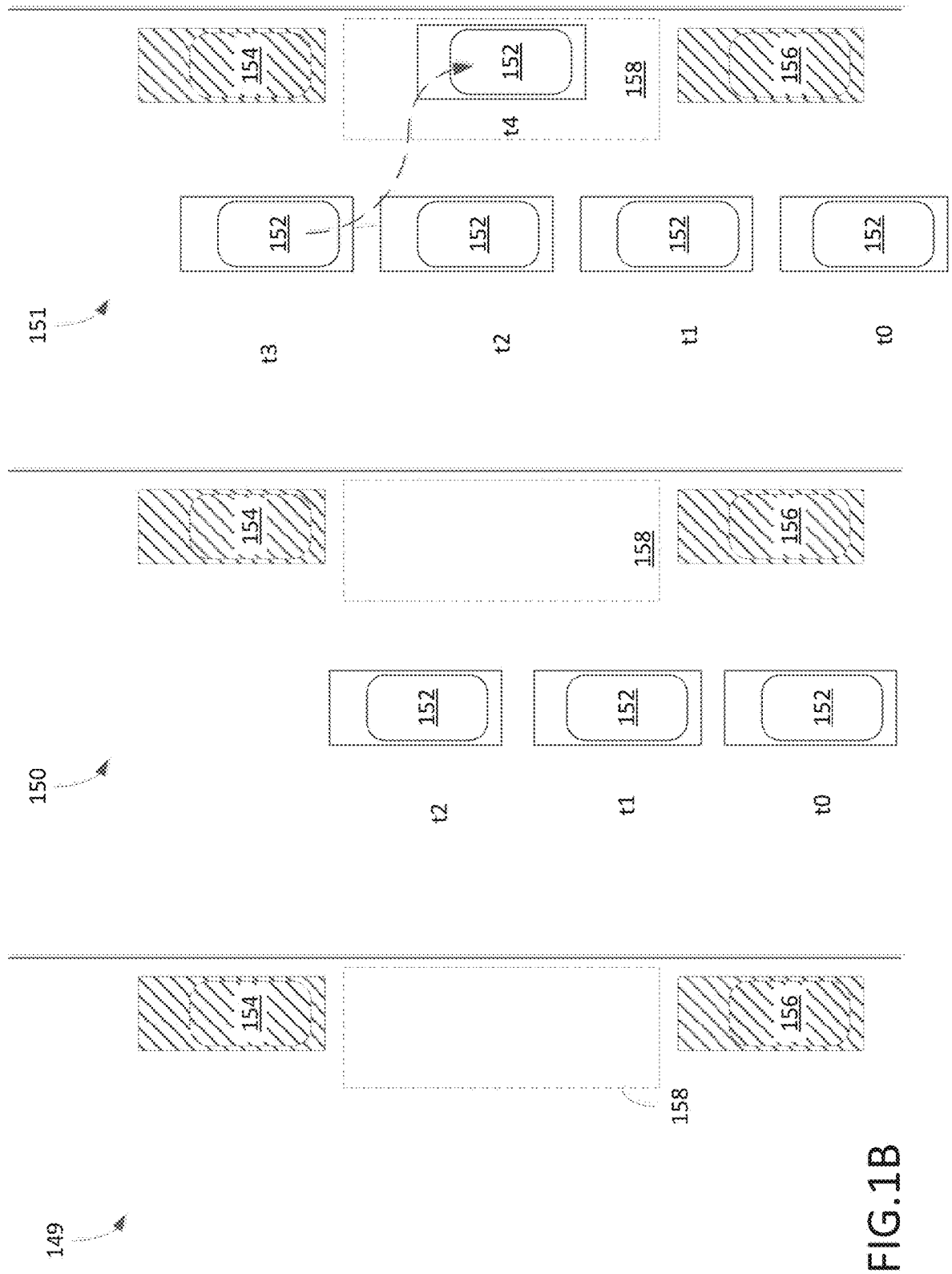

FIG. 1B illustrates several block diagrams 149-151 showing a process of machine learning as to what a parking space should look like via a virtuous cycle in accordance with one embodiment of the present invention. Diagrams 149-151 show three (3) vehicles 152-156 and parking spot or APS 158. Diagram 149 illustrates a first scenario in which car 152 is parked at a parking space or APS 158. After verifying car 152 is stopped and its engine is shut down, the APS model residing in the onboard controller of car 152 detects an APS. In one aspect, the APS model rewinds recorded surrounding information or data leading up to detection of the APS. It should be noted that the recorded surrounding data is retrieved from a local memory coupled to the onboard controller.

In operation, diagram 149 shows an empty parking space 158 which is situated between two parked cars 154-156. Diagram 150 shows car 152 with a parking space detector model or APS model that approaches to the empty space such as parking space 158. Note that time zero (t0) through time four (t4) indicate the time line in which t0 precedes t1 and t1 precedes t2, and so on. It should be noted that the images captured at t0 and t1 should contain good images of empty parking space 158. Diagram 151 illustrates car 152 that has parked in parking space 158 as indicated by arrow. The APS model or parking space detector model determines a valid parking space in according with other information such as GPS coordinates and municipal map of valid parking spaces. After car 152 is parked and an APS is detected, the APS model can roll back the camera and capture images at times t0 and t1 in which many images should be captured along the path between t0 and t1. At t2, parking spot or space 158 should be observed by side or rear cameras of car 152. The captured images, in one embodiment, will be labeled as 'empty parking spot.'

Figure 2A:
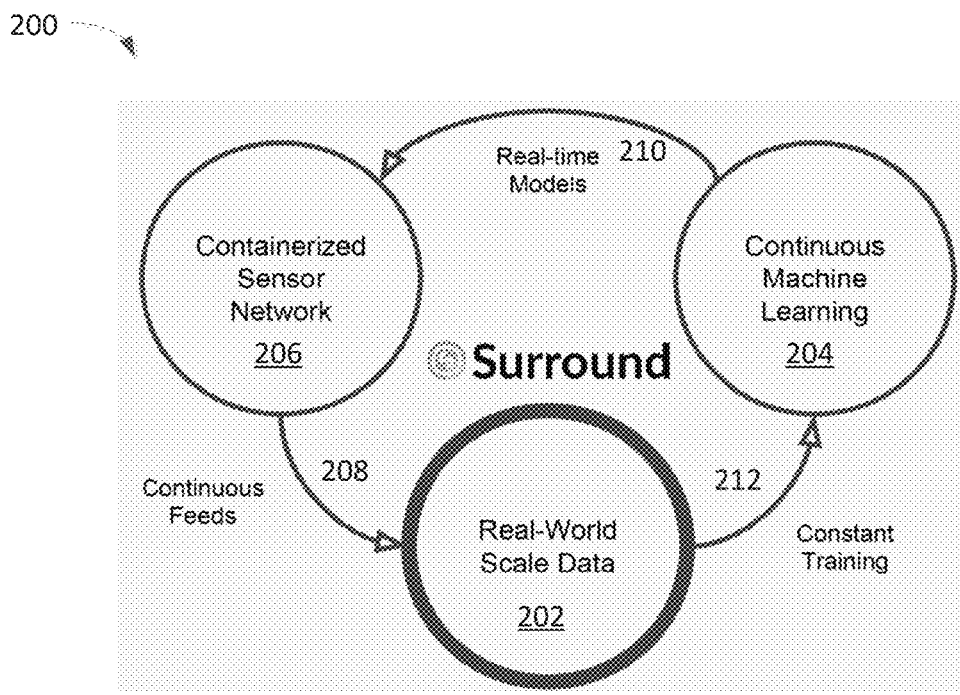
FIGS. 2A-2B are block diagrams illustrating a virtuous cycle capable of facilitating APS management in accordance with one embodiment of the present invention.

FIG. 2A is a block diagram 200 illustrating a virtuous cycle capable of facilitating APS management in accordance with one embodiment of the present invention. Diagram 200, which is similar to diagram 100 shown in FIG. 1A, includes a containerized sensor network 206, real-world scale data 202, and continuous machine learning 204. In one embodiment, continuous machine learning 204 pushes real-time models to containerized sensor network 206 as indicated by numeral 210. Containerized sensor network 206 continuously feeds captured data or images to real-world scale data 202 with uploading in real-time or in a batched format. Real-world scale data 202 provides labeled data to continuous machine learning 204 for constant model training as indicated by numeral 212. It should be noted that the underlying concept of the exemplary embodiment(s) of the present invention would not change if one or more blocks (or elements) were added to or removed from FIG. 2A.

The virtuous cycle illustrated in diagram 200, in one embodiment, is configured to implement APS system wherein containerized sensor network 206 is similar to vehicle 102 as shown in FIG. 1A and real-world scale data 202 is similar to CBN 104 shown in FIG. 1A. Also, continuous machine learning 204 is similar to MCL 106 shown in FIG. 1A. In one aspect, containerized sensor network 206 such as an automobile or car contains a containerized sensing device capable of collecting surrounding information or images using onboard sensors or sensor network when the car is in motion. Based on the APS model, selective recording the collected surrounding information is selectively recorded to a local storage or memory.

Real-world scale data 202, such as cloud or CBN, which is wirelessly coupled to the containerized sensing device, is able to correlate with cloud data and recently obtained APS data for producing labeled data. For example, real-world scale data 202 generates APS labeled data based on historical APS cloud data and the surrounding information sent from the containerized sensing device.

Continuous machine learning 204, such as MLC or cloud, is configured to train and improve APS model based on the labeled data from real-world scale data 202. With continuous gathering data and training APS model(s), the APS system will be able to learn, obtain, and/or collect all available APSs in a metropolitan area. In one embodiment, the APS system is able to provide real-time information to any subscriber(s) regarding available nearby parking space, conditions of the parking space, parking violations, illegal parking, conditions relating to parking structure, and the like.

An advantage of using a virtuous cycle is that it can learn and detect object such as APS in real world.

Figure 2B:
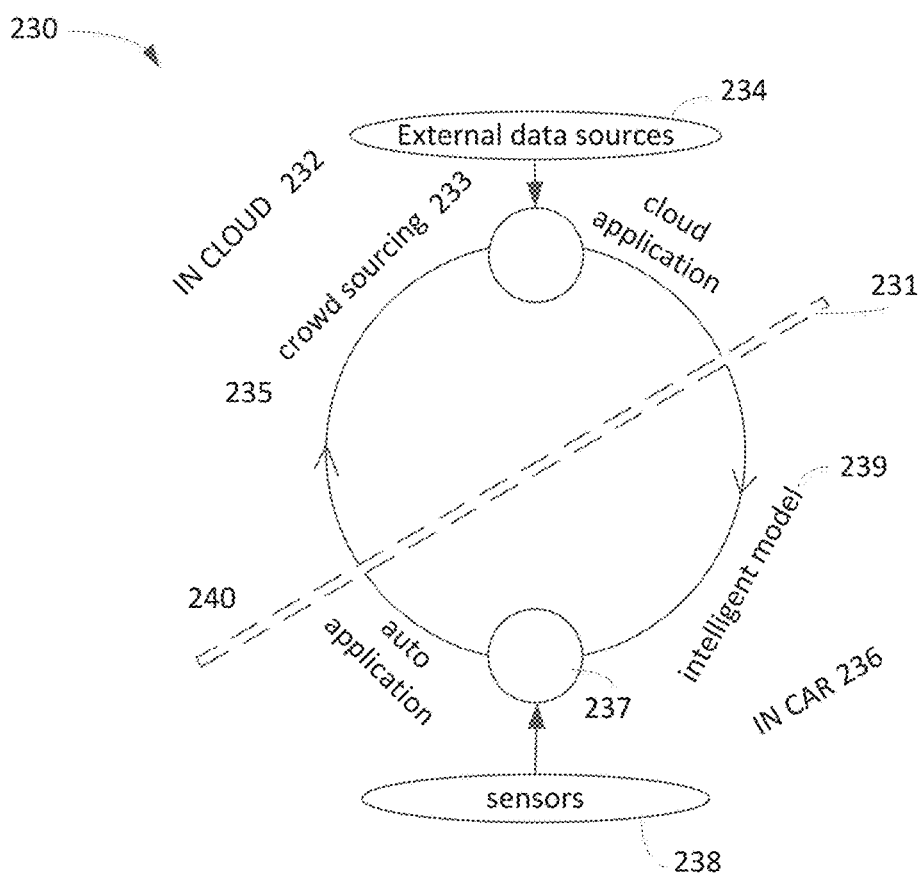

FIG. 2B is a block diagram 230 illustrating an alternative exemplary virtuous cycle capable of facilitating APS management in accordance with one embodiment of the present invention. Diagram 230 includes external data source 234, sensors 238, crowdsourcing 233, and intelligent model 239. In one aspect, components/activities above dotted line 231 are operated in cloud 232, also known as in-cloud component. Components/activities below dotted line 231 are operated in car 236, also known as in-device or in-car component. It should be noted that the underlying concept of the exemplary embodiment(s) of the present invention would not change if one or more blocks (or elements) were added to or removed from FIG. 2B.

In one aspect, in-cloud components and in-device components coordinate to perform desirable user specific tasks. While in-cloud component leverages massive scale to process incoming device information, cloud applications leverage crowd sourced data to produce applications. External data sources can be used to contextualize the applications to facilitate intellectual crowdsourcing. For example, in-car (or in-phone or in-device) portion of the virtuous cycle pushes intelligent data gathering to the edge application. In one example, edge applications can perform intelligent data gathering as well as intelligent in-car processing. It should be noted that the amount of data gathering may rely on sensor data as well as intelligent models which can be loaded to the edge.

Figure 3:
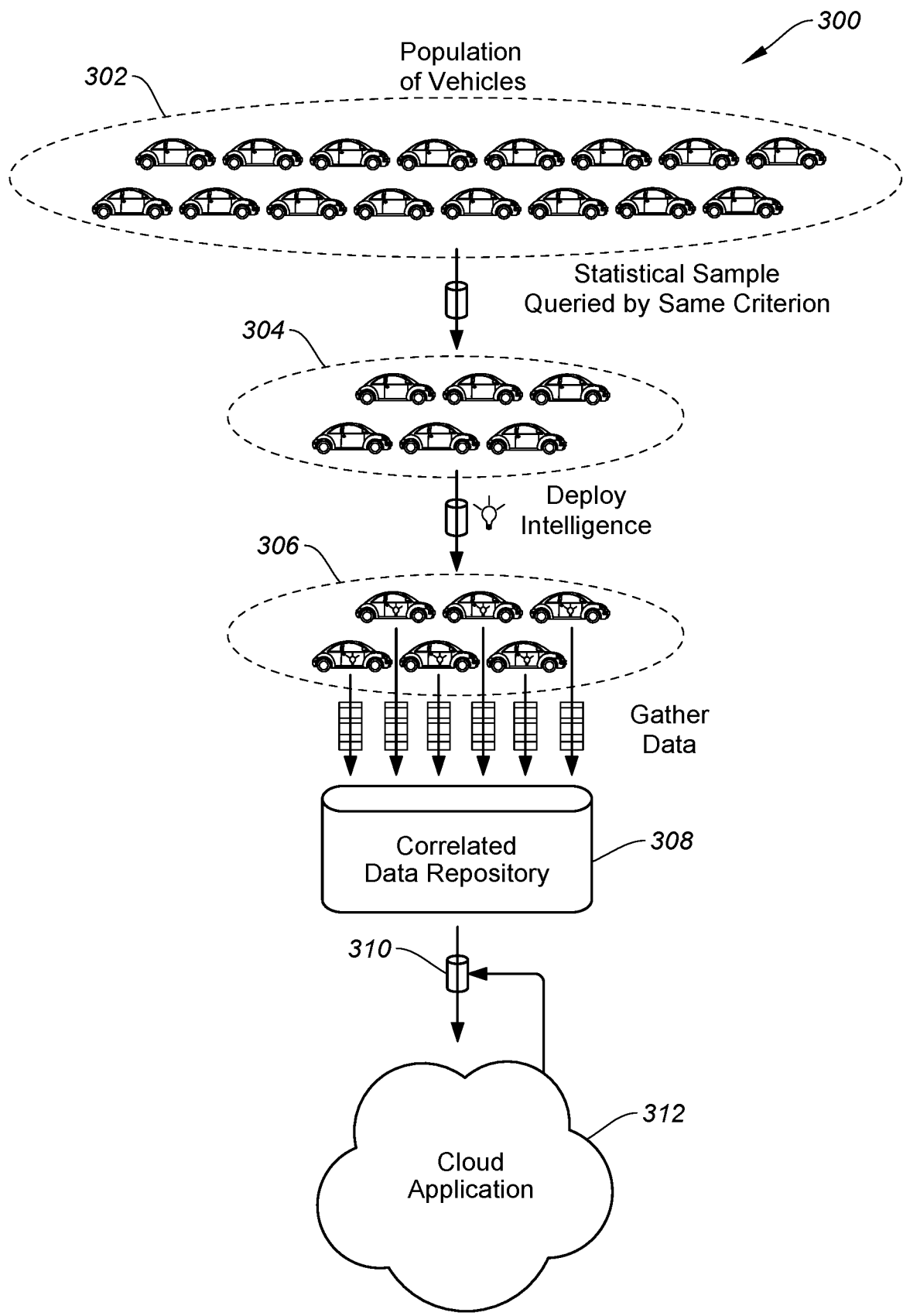
FIG. 3 is a block diagram illustrating a cloud based network using crowdsourcing approach to improve APS model(s) in accordance with one embodiment of the present invention.

FIG. 3 is a block diagram 300 illustrating a cloud based network using crowdsourcing approach to improve APS model(s) in accordance with one embodiment of the present invention. Diagram 300 includes population of vehicles 302, sample population 304, models deployment 306, correlation component 308, and cloud application 312. It should be noted that the underlying concept of the exemplary embodiment(s) of the present invention would not change if one or more blocks (or samples) were added to or removed from FIG. 3.

Crowdsourcing is a process of using various sourcing or specific models generated or contributed from other cloud or Internet users for achieving needed services. For example, crowdsourcing relies on the availability of a large population of vehicles, phones, or other devices to source data 302. For example, a subset of available devices such as sample 304 is chosen by some criterion such as location to perform data gathering tasks. To gather data more efficiently, intelligent models are deployed to a limited number of vehicles 306 for reducing the need of large uploading and processing a great deal of data in the cloud. It should be noted that the chosen devices such as cars 306 monitor the environment with the intelligent model and create succinct data about what has been observed. The data generated by the intelligent models is uploaded to the correlated data store as indicated by numeral 308. It should be noted that the uploading can be performed in real-time for certain information or at a later time for other types of information depending on the need as well as traffic condition.

Correlated component 308 includes correlated data storage capable of providing a mechanism for storing and querying uploaded data. Cloud applications 312, in one embodiment, leverage the correlated data to produce new intelligent models, create crowd sourced applications, and other types of analysis.

Figure 4:
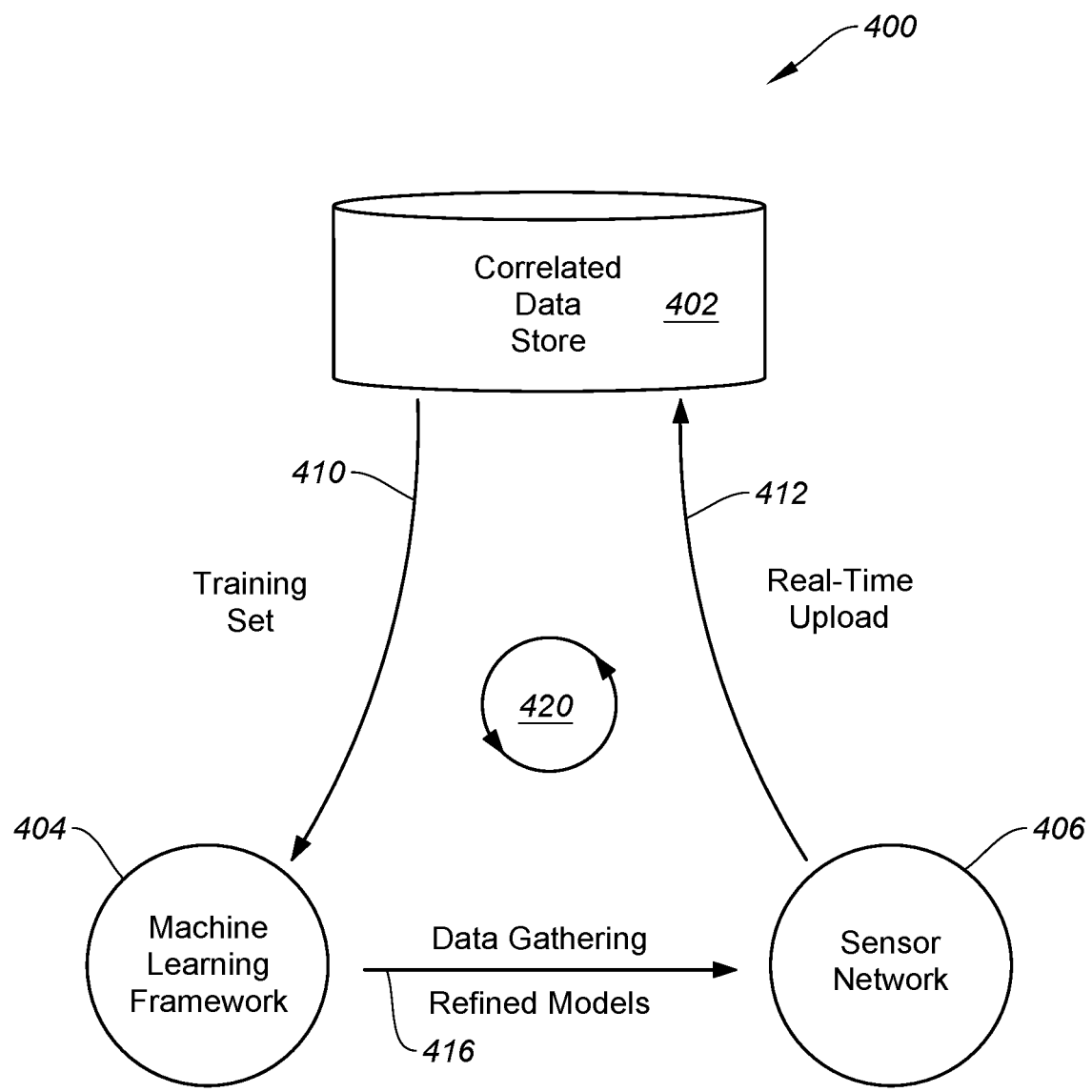
FIG. 4 is a block diagram illustrating an APS system using the virtuous cycle in accordance with one embodiment of the present invention.

FIG. 4 is a block diagram 400 illustrating an APS system using the virtuous cycle in accordance with one embodiment of the present invention. Diagram 400 includes a correlated data store 402, machine learning framework 404, and sensor network 406. Correlated data store 402, machine learning framework 404, and sensor network 406 are coupled by connections 410-416 to form a virtuous cycle as indicated by numeral 420. It should be noted that the underlying concept of the exemplary embodiment(s) of the present invention would not change if one or more blocks (circuit or elements) were added to or removed from FIG. 4.

In one embodiment, correlated data store 402 manages real-time streams of data in such a way that correlations between the data are preserved. Sensor network 406 represents the collection of vehicles, phones, stationary sensors, and other devices, and is capable of uploading real-time events into correlated data store 402 via a wireless communication network 412 in real-time or in a batched format. In one aspect, stationary sensors includes, but not limited to, municipal cameras, webcams in offices and buildings, parking lot cameras, security cameras, and traffic cams capable of collecting real-time images.

The stationary cameras such as municipal cameras and webcams in offices are usually configured to point to streets, buildings, parking lots wherein the images captured by such stationary cameras can be used for accurate labeling. To fuse between motion images captured by vehicles and still images captured by stationary cameras can track object(s) such as car(s) more accurately. Combining or fusing stationary sensors and vehicle sensors can provide both labeling data and historical stationary sampling data also known as stationary "fabric". It should be noted that during the crowdsourcing applications, fusing stationary data (e.g. stationary cameras can collect vehicle speed and position) with real-time moving images can improve ML process.

Machine Learning ("ML") framework 404 manages sensor network 406 and provides mechanisms for analysis and training of ML models. ML framework 404 draws data from correlated data store 402 via a communication network 410 for the purpose of training modes and/or labeled data analysis. ML framework 404 can deploy data gathering modules to gather specific data as well as deploy ML models based on the previously gathered data. The data upload, training, and model deployment cycle can be continuous to enable continuous improvement of models.

Figure 5:
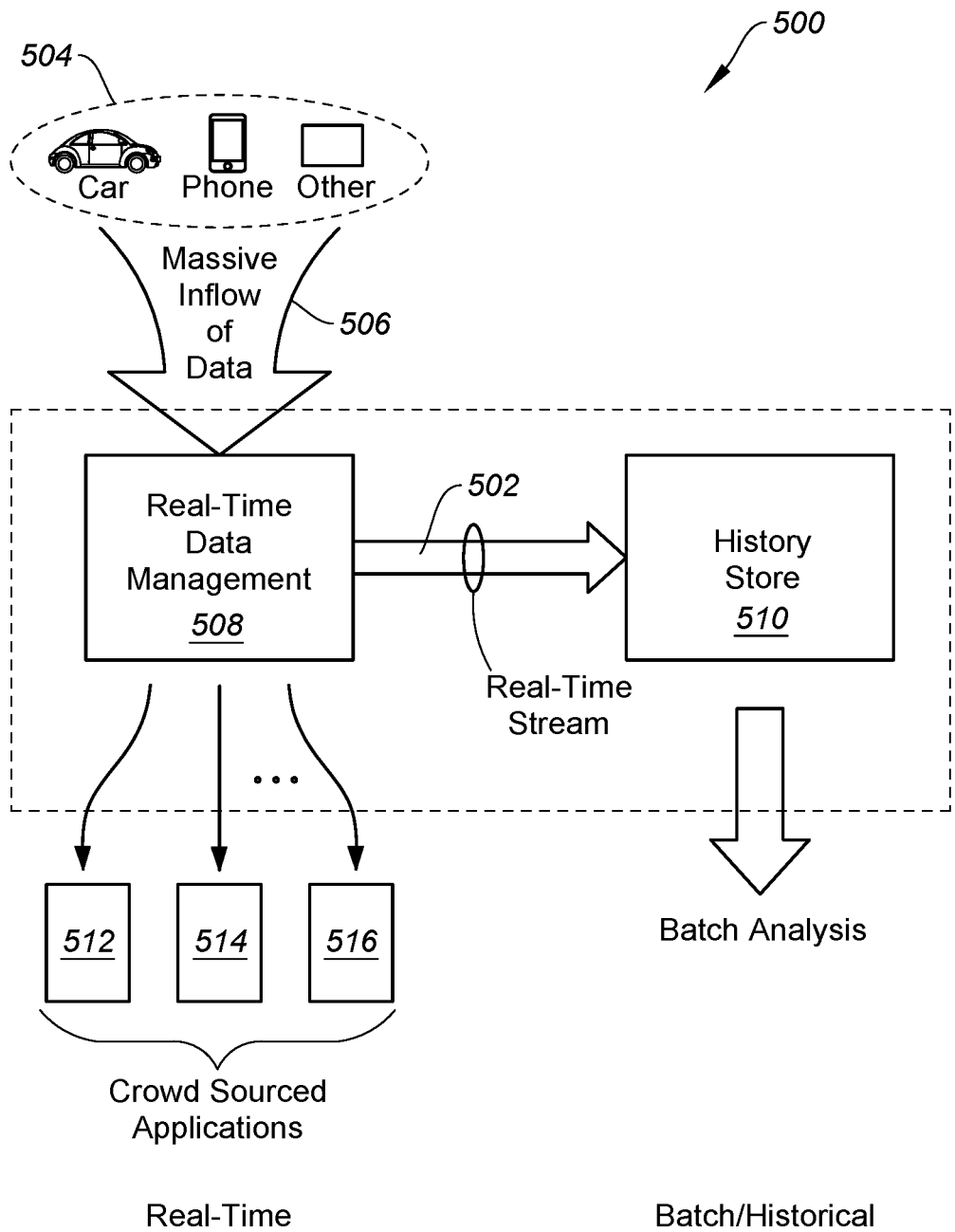
FIG. 5 is a block diagram illustrating an exemplary process of correlating APS data in accordance with one embodiment of the present invention.

FIG. 5 is a block diagram 500 illustrating an exemplary process of correlating APS data in accordance with one embodiment of the present invention. Diagram 500 includes source input 504, real-time data management 508, history store 510, and crowd sourced applications 512-516. In one example, source input 504 includes cars, phones, tablets, watches, computers, and the like capable of collecting massive amount of data or images which will be passed onto real-time data management 508 as indicated by numeral 506. It should be noted that the underlying concept of the exemplary embodiment(s) of the present invention would not change if one or more blocks (or elements) were added to or removed from FIG. 5.

In one aspect, a correlated system includes a real-time portion and a batch/historical portion. The real-time part aims to leverage new data in near or approximately real-time. Real-time component or management 508 is configured to manage a massive amount of influx data 506 coming from cars, phones, and other devices 504. In one aspect, after ingesting data in real-time, real-time data management 508 transmits processed data in bulk to the batch/historical store 510 as well as routes the data to crowd sourced applications 512-516 in real-time.

Crowd sourced applications 512-516, in one embodiment, leverage real-time events to track, analyze, and store information that can be offered to user, clients, and/or subscribers. Batch-Historical side of correlated data store 510 maintains a historical record of potentially all events consumed by the real-time framework. In one example, historical data can be gathered from the real-time stream and it can be stored in a history store 510 that provides high performance, low cost, and durable storage. In one aspect, real-time data management 508 and history store 510 coupled by a connection 502 are configured to perform APS data correlation as indicated by dotted line.

Figure 6:
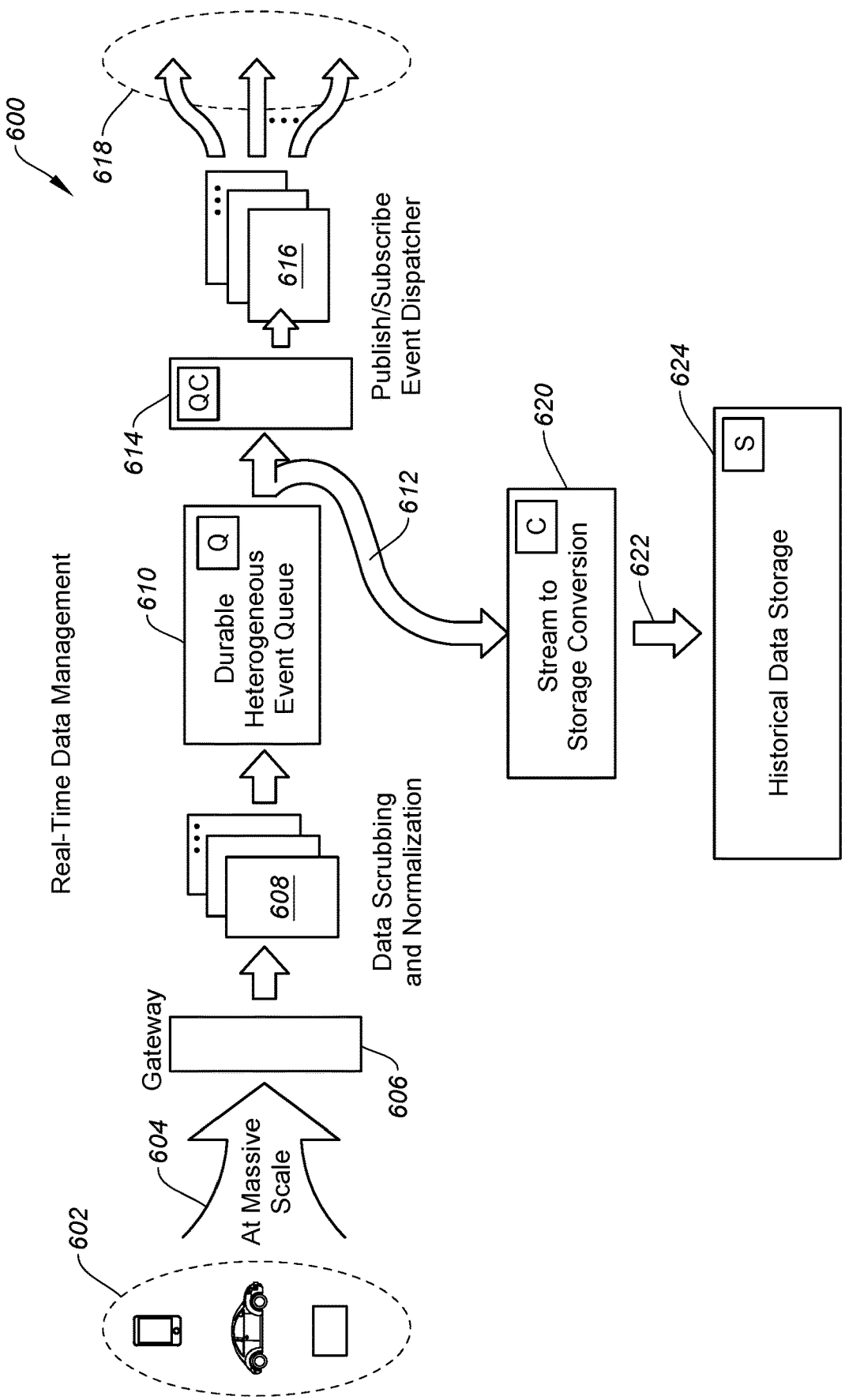
FIG. 6 is a block diagram illustrating an exemplary process of real-time data management for APS in accordance with one embodiment of the present invention.

FIG. 6 is a block diagram 600 illustrating an exemplary process of real-time data management for APS in accordance with one embodiment of the present invention. Diagram 600 includes data input 602, gateway 606, normalizer 608, queue 610, dispatcher 616, storage conversion 620, and historical data storage 624. The process of real-time data management further includes a component 614 for publish and subscribe. It should be noted that the underlying concept of the exemplary embodiment(s) of the present invention would not change if one or more blocks (circuit or elements) were added to or removed from FIG. 6.

The real-time data management, in one embodiment, is able to handle a large numbers (i.e., 10's of millions) of report events to the cloud as indicated by numeral 604. API (application program interface) gateway 606 can handle multiple functions such as client authentication and load balancing of events pushed into the cloud. The real-time data management can leverage standard HTTP protocols. The events are routed to stateless servers for performing data scrubbing and normalization as indicated by numeral 608. The events from multiple sources 602 are aggregated together into a scalable/durable/consistent queue as indicated by numeral 610. An event dispatcher 616 provides a publish/subscribe model for crowd source applications 618 which enables each application to look at a small subset of the event types. The heterogeneous event stream, for example, is captured and converted to files for long-term storage as indicated by numeral 620. Long-term storage 624 provides a scalable and durable repository for historical data.

Figure 7:
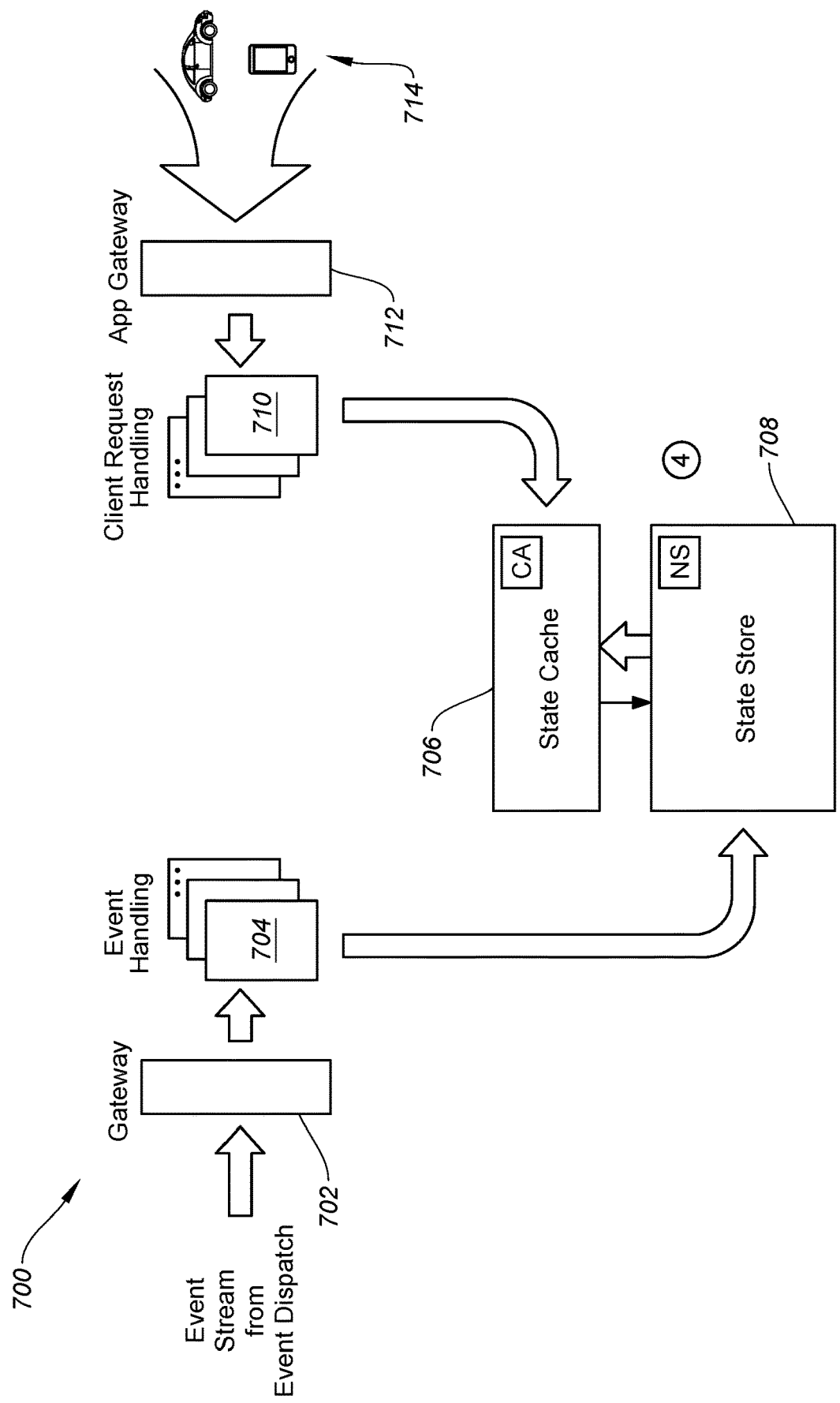
FIG. 7 is a block diagram illustrating a crowd sourced application model for APS in accordance with one embodiment of the present invention.

FIG. 7 is a block diagram 700 illustrating a crowd sourced application model for APS in accordance with one embodiment of the present invention. Diagram 700 includes a gateway 702, event handler 704, state cache 706, state store 708, client request handler 710, gateway 712, and source input 714. In one example, gateway 702 receives an event stream from an event dispatcher and API gateway 712 receives information/data from input source 714. It should be noted that the underlying concept of the exemplary embodiment(s) of the present invention would not change if one or more blocks (or elements) were added to or removed from FIG. 7.

The crowd sourced application model, in one embodiment, facilitates events to be routed to a crowd source application from a real-time data manager. In one example, the events enter gateway 702 using a simple push call. Note that multiple events are handled by one or more servers. The events, in one aspect, are converted into inserts or modifications to a common state store. State store 708 is able to hold data from multiple applications and is scalable and durable. For example. State store 708, besides historical data, is configured to store present data, information about "future data", and/or data that can be shared across applications such as predictive AI (artificial intelligence).

State cache 706, in one example, is used to provide fast access to commonly requested data stored in state store 708. Note that application can be used by clients. API gateway 712 provides authentication and load balancing. Client request handler 710 leverages state store 708 for providing client data.

In an exemplary embodiment, an onboard APS model is able to handle real-time parking detection events. For example, after ML models or APS models for parking detection have been deployed to all or most of the vehicles, the deployed ML models will report to collected data indicating detected parking spots to the APS system for facilitating issuance of real-time parking space availability. The information or data relating to the real-time parking space availability is stored in state store 708. Vehicles 714 looking for parking space nearby can, for example, access the APS system using gateway 712.

Figure 8:
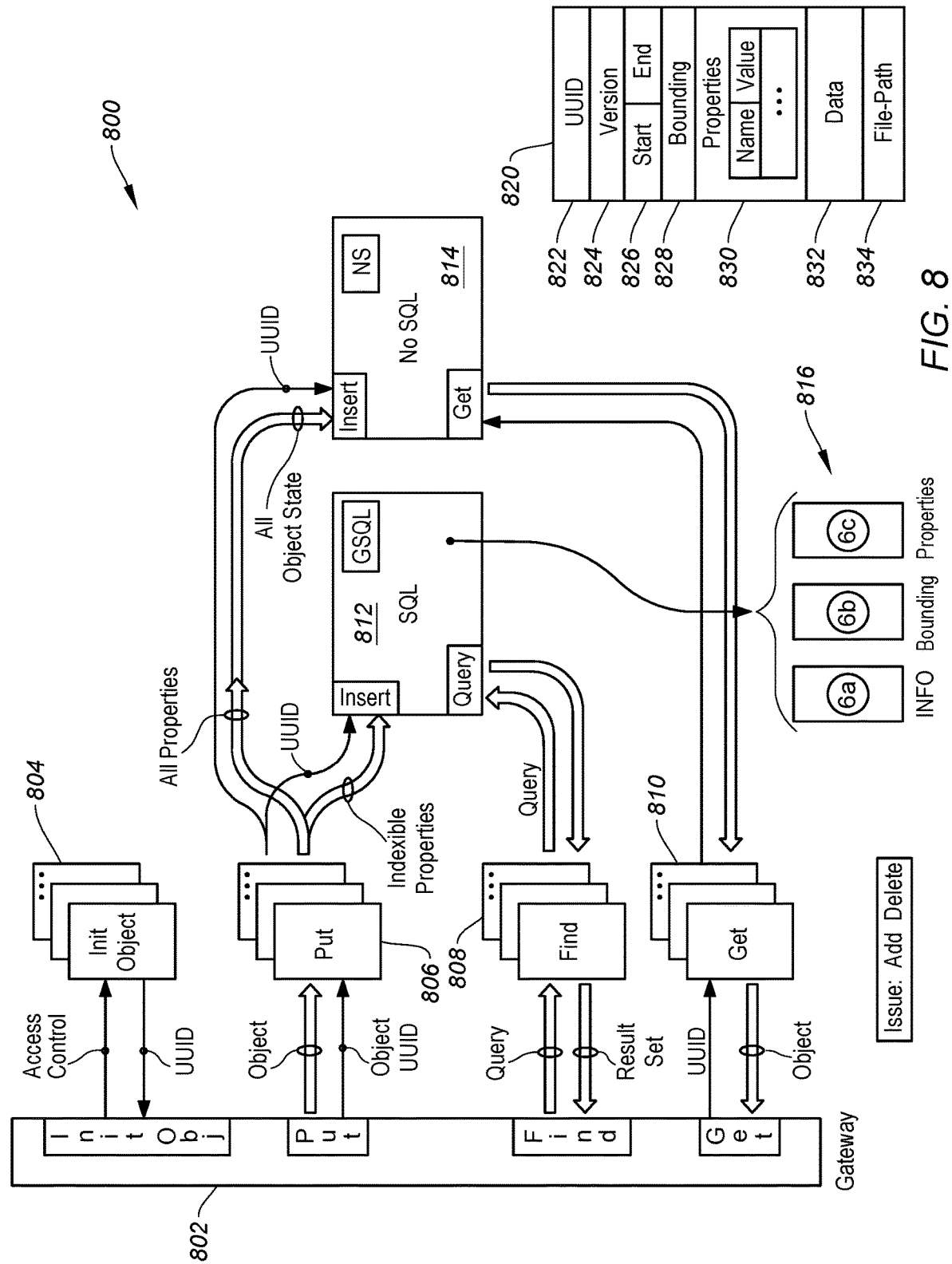
FIG. 8 is a block diagram illustrating a method of storing APS related data using a geo-spatial objective storage in accordance with one embodiment of the present invention.

FIG. 8 is a block diagram 800 illustrating a method of storing APS related data using a geo-spatial objective storage in accordance with one embodiment of the present invention. Diagram 800 includes gateway 802, initial object 804, put call 806, find call 808, get call 810, SQL (Structured Query Language) 812, non-SQL 814, and geo-spatial object storage 820. It should be noted that the underlying concept of the exemplary embodiment(s) of the present invention would not change if one or more blocks (circuit or elements) were added to or removed from FIG. 8.

A benefit of using geo-spatial objective storage approach is to facilitate selective queries to the historical data. For example, using geo-spatial objective storage to train parking spaces between Seattle and Tokyo can be effective since "parking spot" profiles for Seattle and Tokyo can be quite different because of different types of vehicles, customs, and/or local ordinance. In one aspect, the Geo-spatial store is able to select a subset of training data that is suitable to the targeted region.

Geo-spatial object storage 820, in one aspect, stores or holds objects which may include time period, spatial extent, ancillary information, and optional linked file. In one embodiment, geo-spatial object storage 820 includes UUID (universally unique identifier) 822, version 824, start and end time 826, bounding 828, properties 830, data 832, and file-path 834. For example, while UUID 822 identifies an object, all objects have version(s) 824 that allow schema to change in the future. Start and end time 826 indicates an optional time period with a start time and an end time. An optional bounding geometry 828 is used to specify spatial extent of an object. An optional set of properties 830 is used to specify name-value pairs. Data 832 can be binary data. An optional file path 834 may be used to associate with the object of a file containing relevant information such as MPEG (Moving Picture Experts Group) stream.

In one embodiment. API gateway 802 is used to provide access to the service. Before an object can be added to the store, the object is assigned an UUID which is provided by the initial object call. Once UUID is established for a new object, the put call 804 stores the object state. The state is stored durably in Non-SQL store 814 along with UUID. A portion of UUID is used as hash partition for scale-out. The indexible properties includes version, time duration, bounding, and properties which are inserted in a scalable SQL store 812 for indexing. The Non-SQL store 814 is used to contain the full object state. Non-SQL store 814 is scaled-out using UUID as, for example, a partition key.

SQL store 812 is used to create index tables that can be used to perform queries. SQL store 812 may include three tables 816 containing information, bounding, and properties. For example, information holds a primary key, objects void, creation timestamp, state of object and object properties "version" and "time duration." Bounding holds the bounding geometry from the object and the id of the associated information table entry. Properties hold property name/value pairs from the object stored as one name/value pair per row along with ID of associated info table entry.

Find call 808, in one embodiment, accepts a query and returns a result set, and issues a SQL query to SQL store 812 and returns a result set containing UUID that matches the query.

Figure 9:
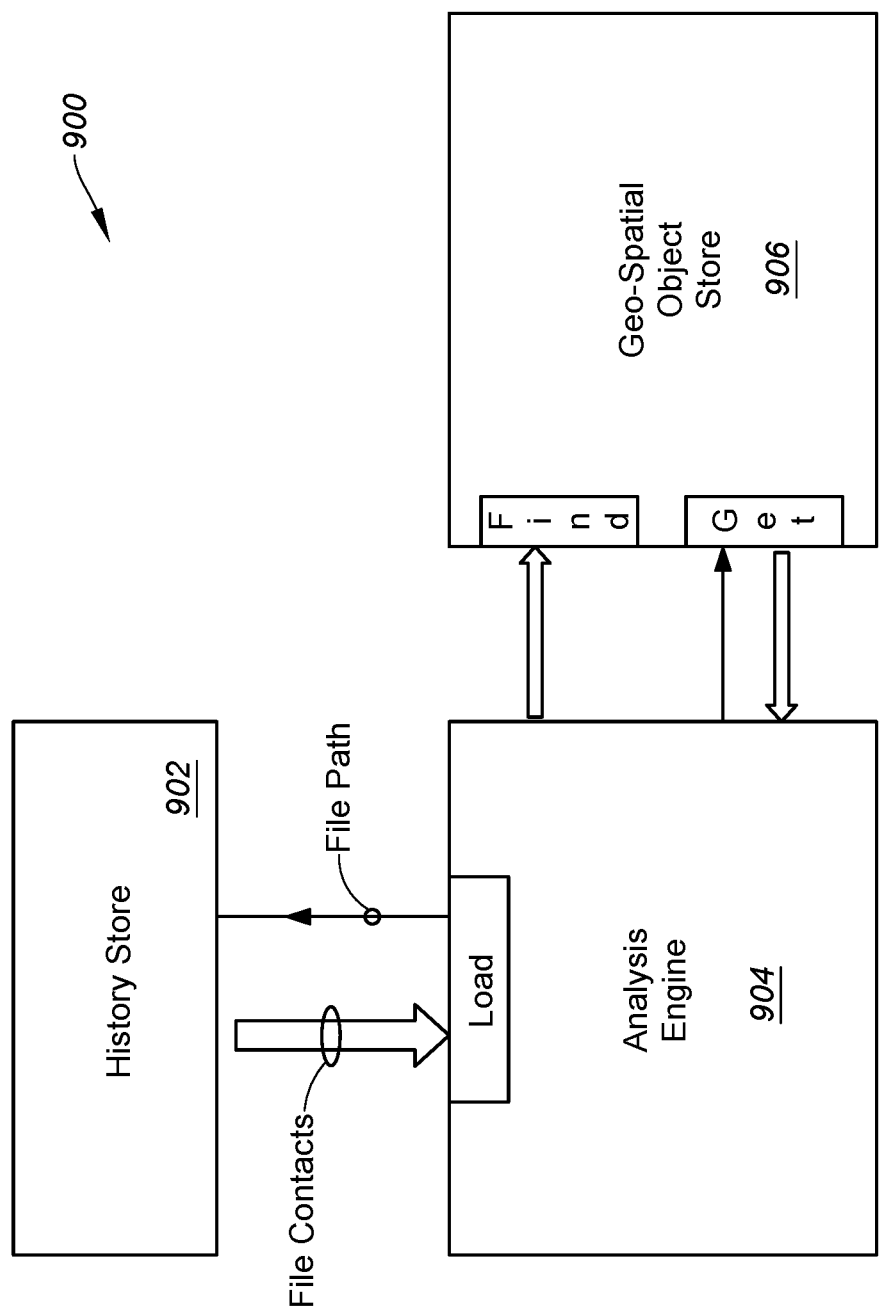
FIG. 9 is a block diagram illustrating an exemplary approach of analysis engine analyzing APS data in accordance with one embodiment of the present invention.

FIG. 9 is a block diagram 900 illustrating an exemplary approach of analysis engine analyzing APS data in accordance with one embodiment of the present invention. Diagram 900 includes history store 902, analysis engine 904, and geo-spatial object store 906. It should be noted that the underlying concept of the exemplary embodiment(s) of the present invention would not change if one or more blocks (circuit or elements) were added to or removed from FIG. 9.

In one aspect, diagram 900 illustrates analysis engine 904 containing ML training component capable of analyzing labeled data based on real-time captured APS data and historical data. The data transformation engine, in one example, interacts with Geo-spatial object store 906 to locate relevant data and with history store to process the data. Optimally, the transformed data may be stored. In operation, the data transformation engine issues a find query (i.e., available nearby parking space) and gets in return a result set of UUID's indicating a proposed parking space for the inquiry. The result set is subsequently used to obtain object state. If the object state contains a file reference, the reference can be used to access the file contents.

It should be noted that virtuous cycle employing ML training component to provide continuous model training using real-time data as well as historical samples, and deliver a parking space detection model for one or more subscribed vehicles. A feature of virtuous cycle is able to continuous training a model and able to provide a real-time or near real-time result. It should be noted that the virtuous cycle is applicable to various other fields, such as, but not limited to, business intelligence, law enforcement, medical services, military applications, and the like.

Figure 10:
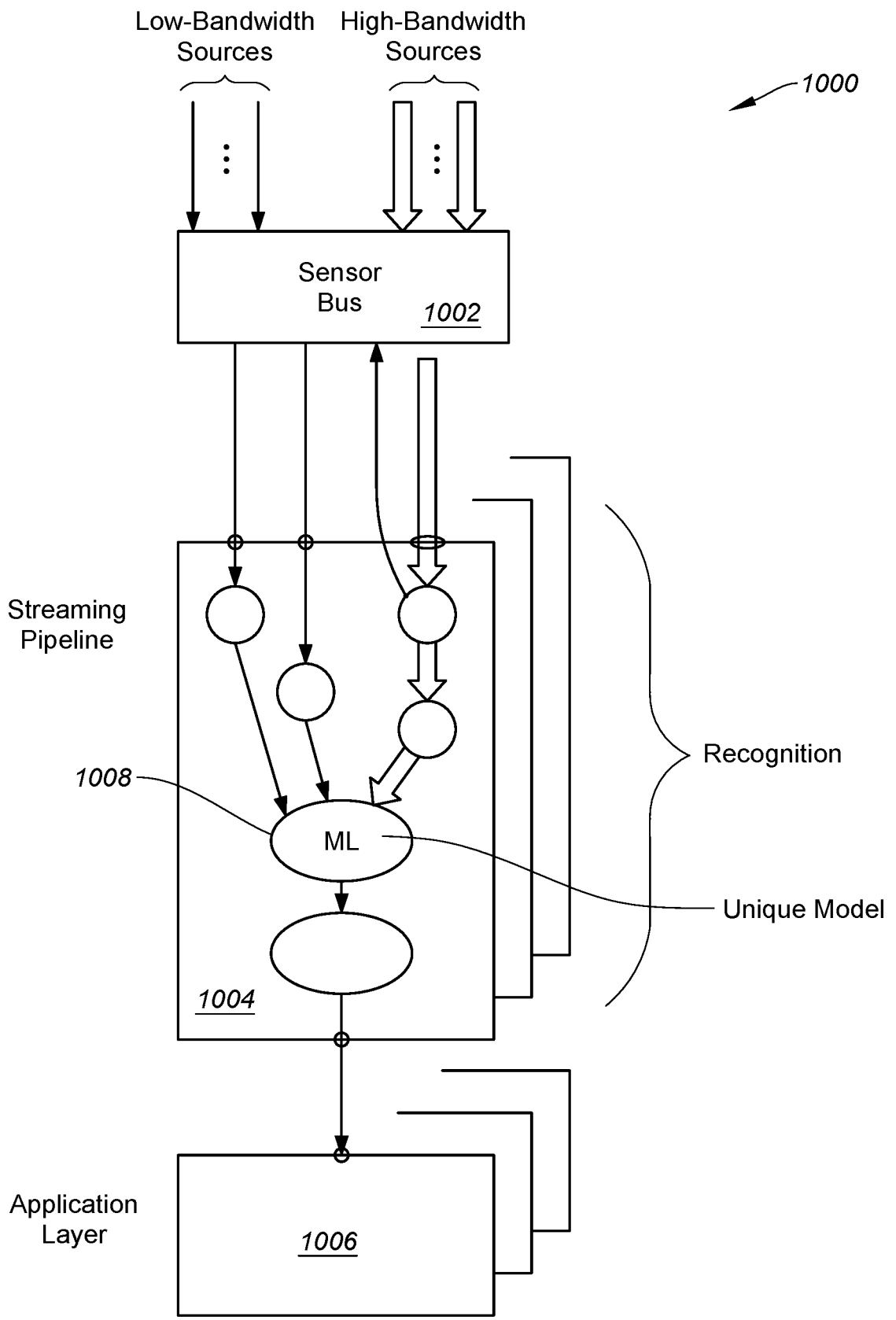
FIG. 10 is a block diagram illustrating an exemplary containerized sensor network used for sensing APS related information in accordance with one embodiment of the present invention.

FIG. 10 is a block diagram 1000 illustrating an exemplary containerized sensor network used for sensing APS related information in accordance with one embodiment of the present invention. Diagram 1000 includes a sensor bus 1002, streaming pipeline 1004, and application layer 1006 wherein sensor bus 1002 is able to receive low-bandwidth sources and high-bandwidth sources. Streaming pipeline 1004, in one embodiment, includes ML capable of generating unique model such as model 1008. It should be noted that the underlying concept of the exemplary embodiment(s) of the present invention would not change if one or more blocks (circuit or elements) were added to or removed from FIG. 10.

Figure 11:
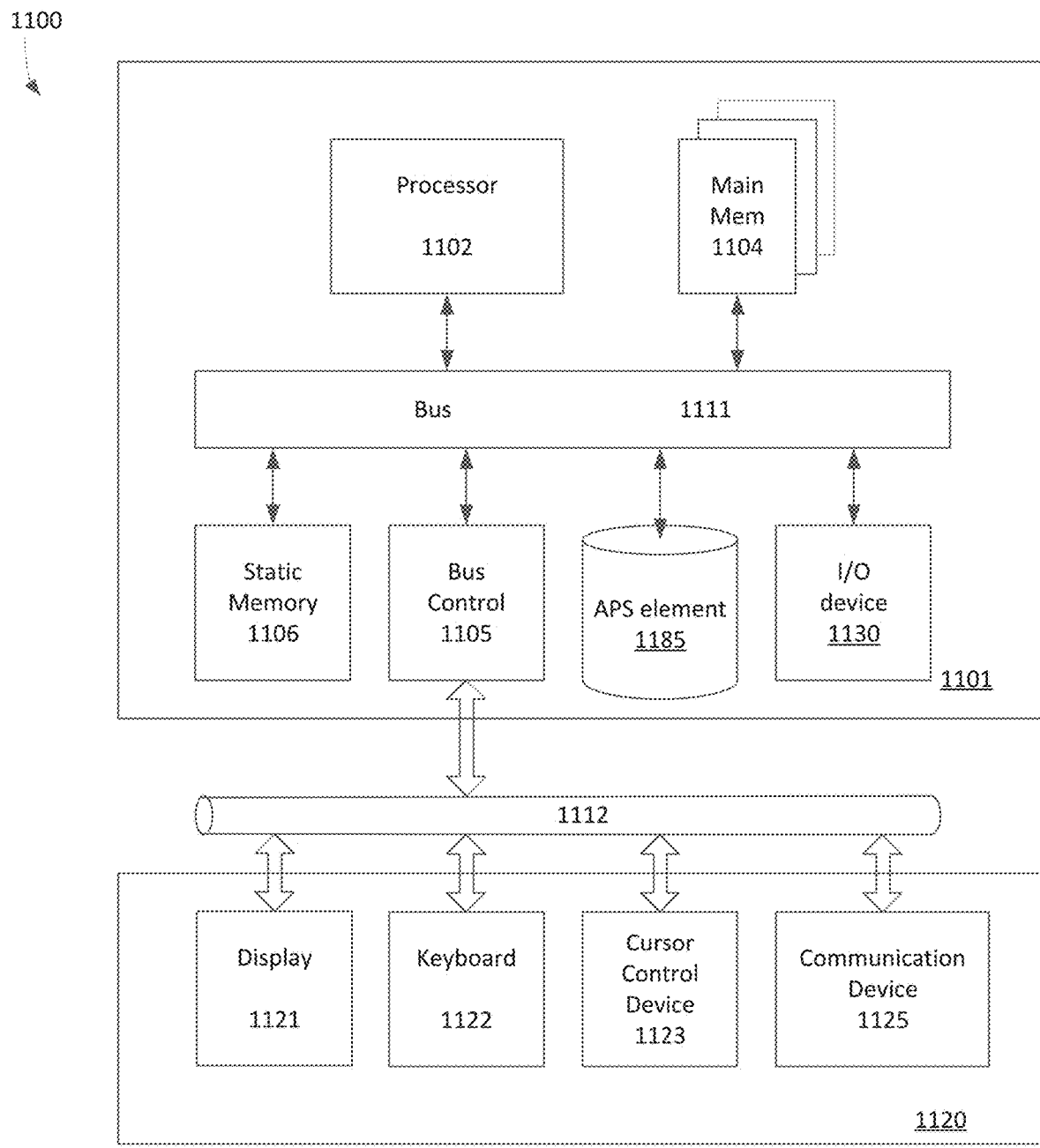
FIG. 11 is a block diagram illustrating a processing device or computer system which can be installed in a vehicle for facilitating the virtuous cycle in accordance with one embodiment of the present invention.

FIG. 11 is a block diagram 1100 illustrating a processing device or computer system which can be installed in a vehicle to support onboard cameras, CAN (Controller Area Network) bus, Inertial Measurement Units, Lidar, et cetera for facilitating virtuous cycle in accordance with one embodiment of the present invention. Computer system or APS system 1100 can include a processing unit 1101, an interface bus 1112, and an input/output ("IO") unit 1120. Processing unit 1101 includes a processor 1102, a main memory 1104, a system bus 1111, a static memory device 1106, a bus control unit 1105, an I/O element 1130, and APS element 1185. It should be noted that the underlying concept of the exemplary embodiment(s) of the present invention would not change if one or more blocks (circuit or elements) were added to or removed from FIG. 11.

Bus 1111 is used to transmit information between various components and processor 1102 for data processing. Processor 1102 may be any of a wide variety of general-purpose processors, embedded processors, or microprocessors such as ARM® embedded processors, Intel® Core™ Duo, Core™ Quad, Xeon®, Pentium™ microprocessor, Motorola™ 68040, AMD® family processors, or Power PC™ microprocessor.

Main memory 1104, which may include multiple levels of cache memories, stores frequently used data and instructions. Main memory 1104 may be RAM (random access memory), MRAM (magnetic RAM), or flash memory. Static memory 1106 may be a ROM (read-only memory), which is coupled to bus 1111, for storing static information and/or instructions. Bus control unit 1105 is coupled to buses 1111-1112 and controls which component, such as main memory 1104 or processor 1102, can use the bus. Bus control unit 1105 manages the communications between bus 1111 and bus 1112.

I/O unit 1120, in one embodiment, includes a display 1121, keyboard 1122, cursor control device 1123, and communication device 1125. Display device 1121 may be a liquid crystal device, cathode ray tube ("CRT"), touch-screen display, or other suitable display device. Display 1121 projects or displays images of a graphical planning board. Keyboard 1122 may be a conventional alphanumeric input device for communicating information between computer system 1100 and computer operator(s). Another type of user input device is cursor control device 1123, such as a conventional mouse, touch mouse, trackball, or other type of cursor for communicating information between system 1100 and user(s).

APS element 1185, in one embodiment, is coupled to bus 1111, and configured to interface with the virtuous cycle for facilitating APS management. For example, if APS system 1100 is installed in a car, APS element 1185 is used to operate the APS model as well as interface with the cloud based network. If APS system 1100 is placed at the cloud based network, APS element 1185 can be configured to handle the correlating process for generating labeled data.

Communication device 1125 is coupled to bus 1111 for accessing information from remote computers or servers, such as server 104 or other computers, through wide-area network 102. Communication device 1125 may include a modem or a network interface device, or other similar devices that facilitate communication between computer 1100 and the network. Computer system 1100 may be coupled to a number of servers via a network infrastructure such as the Internet.

The exemplary embodiment of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

Figure 12:
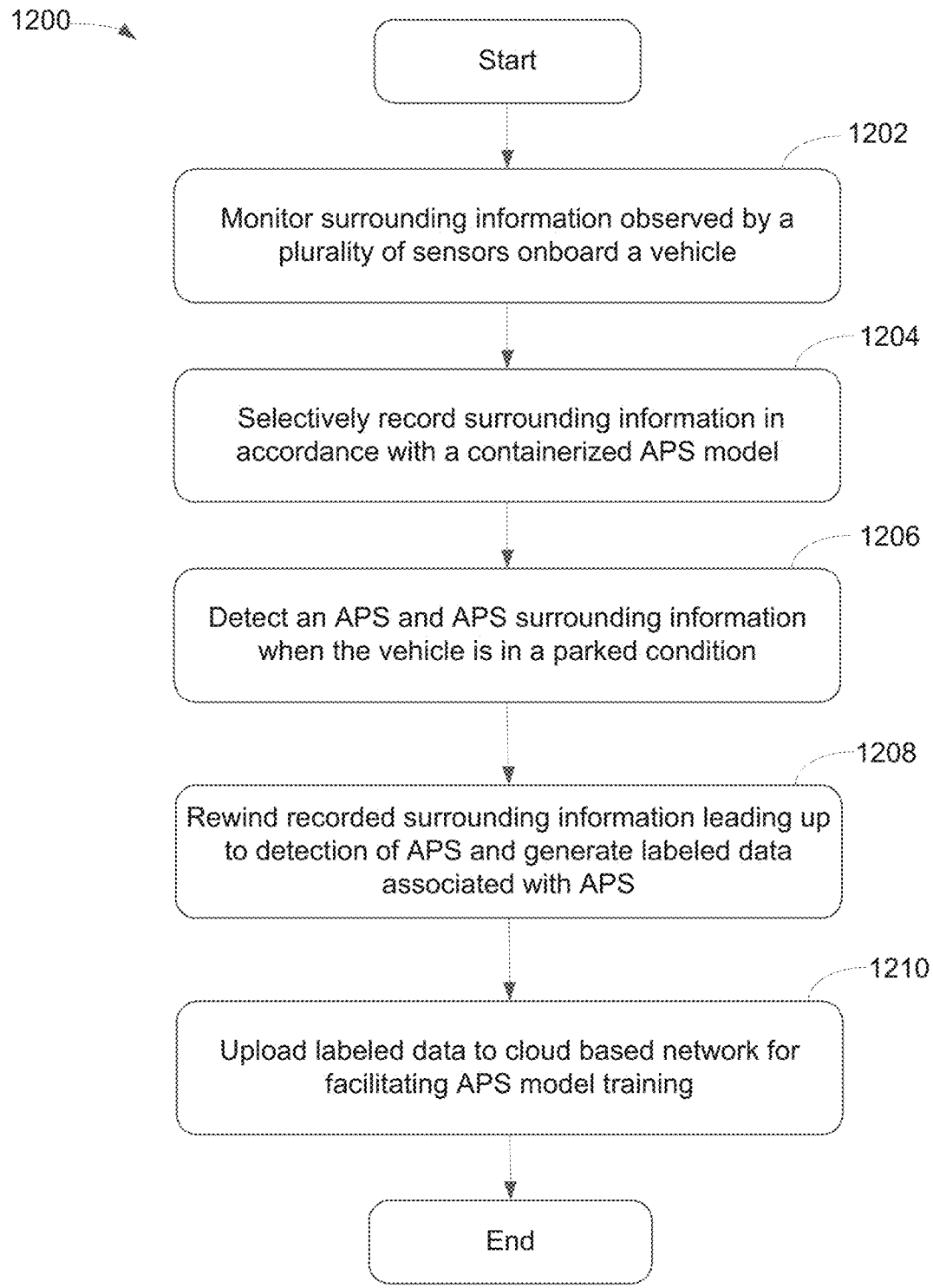
FIG. 12 is a flowchart illustrating a process of APS system capable of identifying APS in accordance with one embodiment of the present invention.

FIG. 12 is a flowchart 1200 illustrating a process of APS system capable of identifying APS in accordance with one embodiment of the present invention. At block 1202, a process capable of managing APS is capable of monitoring surrounding information observed by a set of sensors onboard a vehicle as the vehicle is in motion. For example, the vehicle is able to activate multiple outward-looking cameras situated on the vehicle for capturing images as the vehicle is in motion.

At block 1204, the surrounding information is selectively recorded based on the instructions or requests generated by a containerized APS model which is downloaded and/or received from the machine learning center. For example, upon identifying APS related images from the captured images, such images are stored in an onboard memory device of the vehicle.

At block 1206, an APS and APS surrounding information are detected when the vehicle is in a parked condition. A parking space, for instance, is subsequently identified.

At block 1208, upon rewinding recorded surrounding information leading up to detection of APS, labeled data which is associated with the APS is generated in response to the APS and the recorded surrounding information. For example, the location and/or orientation of APS can be identified based on the recorded vehicle movements prior to detecting the APS.

At block 1210, the process, in one aspect, is capable of uploading the labeled data to the cloud based network for facilitating APS model training at a machine learning center via a virtuous cycle. In one embodiment, after separating the real-time data from the labeled data, the real-time data is uploaded to the cloud based network in real-time via a wireless communication network. After separating the batched data from the labeled data, uploading the batched data is uploaded to the cloud based network at a later time. In one example, after feeding real-time labeled data from the vehicle to the cloud based network for correlating and revising labeled data, the revised labeled data is forwarded to the machine learning center for training APS model. After training, an updated APS model is pushed to the vehicle for collecting surrounding information.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method configured to manage an automobile parking space model utilizing a plurality of sensors, a machine learning center, and a cloud based network, comprising:
   while a vehicle is in motion:
      monitoring surrounding information observed by the plurality of sensors onboard the vehicle as the vehicle is in motion;
      selectively recording the surrounding information in accordance with requests generated by the automobile parking space model received from the machine learning center;
   after the vehicle is parked:
      detecting that the vehicle is in a parked condition;
      rewinding previously recorded surrounding information leading up to detection of that the vehicle is in the parked condition, including identifying an orientation of an automobile parking space in which the vehicle is parked based on recorded vehicle movements prior to detecting that the vehicle is parked; and
      producing rewound information based on the previously recorded surrounding information;
   generating labeled data associated with the automobile parking space in response to the rewound information for indicating an empty parking spot; and
   uploading the labeled data to the cloud based network for facilitating automobile parking space model training at the machine learning center to teach the automobile parking space model what a parking space looks like.

2. The method of claim 1, further comprising correlating the labeled data with location information, time stamp, and vicinity traffic condition obtained from the cloud based network to update correlated labeled data relating to the automobile parking space.

3. The method of claim 2, further comprising correlating the labeled data with local events, additional sampling data, and weather conditions obtained from the cloud based network to update the correlated labeled data relating to the automobile parking space.

4. The method of claim 3, further comprising training the automobile parking space model in accordance with the correlated labeled data forwarded from the cloud based network to the machine learning center.

5. The method of claim 1, further comprising pushing the automobile parking space model to an onboard digital processing unit in the vehicle via a wireless communication network.

6. The method of claim 1, wherein monitoring surrounding information observed by the plurality of sensors onboard the vehicle includes activating outward-looking cameras situated on the vehicle to capture images as the vehicle is in motion.

7. The method of claim 1, wherein selectively recording the surrounding information includes identifying automobile parking space related images from captured images and storing the automobile parking space related images in an onboard memory device of the vehicle.

8. The method of claim 1, wherein detecting that the vehicle is in a parking condition includes identifying the automobile parking space.

9. The method of claim 1, wherein uploading the labeled data to the cloud based network includes separating real-time data from the labeled data and uploading the real-time data to the cloud based network in real-time via a wireless communication network.

10. The method of claim 9, wherein uploading the labeled data to the cloud based network includes separating batched data from the labeled data and uploading the batched data to the cloud based network at a later time.

11. The method of claim 1, wherein uploading the labeled data to the cloud based networking includes,
feeding real-time labeled data from the vehicle to the cloud based network for correlating and revising labeled data;
forwarding revised labeled data to the machine learning center for training the automobile parking space model; and
pushing a trained automobile parking space model to the vehicle for collecting additional surrounding information.

12. A network configuration able to manage an automobile parking space model, comprising:
a sensing device configured to collect and selectively record surrounding information observed by a plurality of onboard sensors of an automobile in accordance with signals generated by the automobile parking space model when the automobile is in motion, wherein the sensing device is configured to facilitate, after the automobile is parked, detection that the automobile is in a parked condition and an orientation of an automobile parking space in which the automobile is parked and generation of automobile parking space data based on rewound information that is recorded surrounding information leading up to detection that the automobile is in the parked condition;
a cloud based network wirelessly coupled to the sensing device and configured to correlate and generate labeled data associated with the automobile parking space based on historical automobile parking space cloud data and the automobile parking space data sent from the sensing device; and
a machine learning center coupled to the cloud based network and configured to train and improve the automobile par kina space model based on the labeled data from the cloud based network to teach the automobile parking space model what a parking space looks like.

13. The network configuration of claim 12, wherein the automobile includes forward-looking cameras configured to collect real-time images as the automobile moves across a geographical area.

14. The network configuration of claim 13, wherein the sensing device of the automobile includes a memory, controller, and transmitter, wherein the memory stores at least a portion of real-time images collected by the forward-looking cameras installed at the automobile.

15. The network configuration of claim 12, wherein the cloud based network correlates real-time data from the automobile with historical samples with large automobile population to produce labeled automobile parking space cloud data.

16. The network configuration of claim 15, wherein the machine learning center is configured to train and refine the automobile parking space model in response to the labeled automobile parking space cloud data from the cloud based network and generates a refined automobile parking space model.

17. The network configuration of claim 16, wherein the automobile receives the refined automobile parking space model from the machine learning center and begins to collect additional surrounding information based on the refined automobile parking space model.

18. A method configured to manage an automobile parking space model utilizing a plurality of sensors, a machine learning center, and a cloud based network, comprising:
storing real-time data collected by the plurality of sensors in a memory situated inside of an automobile based on the automobile parking space model when the automobile is driving;
detecting when the automobile is stopped and in a parked condition;
retrieving, after the automobile is in the parked condition, a predefined section of stored real-time data by rewinding previously stored real-time data leading up to detection that the automobile is in the parked condition to identify a parking event;
identifying a location and orientation of an automobile parking space in which the automobile is parked based on movement of the automobile prior to detecting that the automobile is parked;
generating labeled data associated with the automobile parking space in response to the predefined section of the stored real-time data; and
uploading the labeled data to the cloud based network for facilitating model training at a machine learning process to teach the automobile parking space model what a parking space looks like.

19. The method of claim 18, further comprising correlating the labeled data with location information, time stamp, and vicinity traffic condition obtained from the cloud based network for facilitating model training.

* * * * *

UNITED STATES PATENT AND TRADEMARK OFFICE
CERTIFICATE OF CORRECTION

PATENT NO.       : 10,956,758 B2
APPLICATION NO.  : 15/621723
DATED            : March 23, 2021
INVENTOR(S)      : Robert Victor Welland et al.

Page 1 of 1

It is certified that error appears in the above-identified patent and that said Letters Patent is hereby corrected as shown below:

In the Claims

<u>Column 16, Claim 12, Line 6:</u>
"automobile par kina space model based on the labeled data"
Should read:
--automobile parking space model based on the labeled data--.

Signed and Sealed this
Fifteenth Day of February, 2022

Drew Hirshfeld
*Performing the Functions and Duties of the
Under Secretary of Commerce for Intellectual Property and
Director of the United States Patent and Trademark Office*